US005545966A

United States Patent [19]
Ramos et al.

[11] Patent Number: 5,545,966
[45] Date of Patent: Aug. 13, 1996

[54] AIR/LIQUID COOLED METALLIC TURN FOR HIGH FREQUENCY HIGH POWER CHARGING TRANSFORMERS

[75] Inventors: Sergio Ramos, Wilmington; John T. Hall, Woodland Hills; Herbert J. Tanzer, Topanga, all of Calif.; Rudy Severns, Cottage Grove, Oreg.

[73] Assignee: Delco Electronics Corp., Kokomo, Ind.

[21] Appl. No.: 237,492

[22] Filed: Apr. 29, 1994

[51] Int. Cl.$^6$ .................................................. H01M 10/46
[52] U.S. Cl. .......................................... 320/2; 336/DIG. 2
[58] Field of Search .................................. 320/2; 336/59, 336/60, 61, 82, 83, 179, DIG. 2

[56]  References Cited

U.S. PATENT DOCUMENTS

| 5,095,259 | 3/1992 | Bailey et al. | 320/2 |
| 5,341,083 | 8/1994 | Klontz et al. | 320/2 |
| 5,408,209 | 4/1995 | Tanzer et al. | 320/2 X |
| 5,412,304 | 5/1995 | Abbott | 320/2 |

*Primary Examiner*—Peter S. Wong
*Assistant Examiner*—Edward Tso
*Attorney, Agent, or Firm*—Mark A. Navarre

[57] ABSTRACT

Heat exchanger that are also outer turns of secondary windings of a transformer for use in a charge port of battery charging apparatus. The outer turns may have any shape or thickness, may be air or liquid cooled, or may be vapor changers (heat pipes). Other turns of the secondary windings cannot be used in this manner because they cause excessive energy dissipation, due to proximity losses. When used to a liquid cooled turn, the present invention comprises porting liquid coolant from a cooling system including a pump, a compact heat exchanger, and a fan through the outer windings. Heat dissipation from the secondary windings of the transformer is efficiently removed by providing an internal coolant flow passage or passages formed or integrated at the center of the outer windings comprising the heat exchangers. The internal passages may be configured in several ways. One approach is to construct thin, flat, self-contained flexible coolant bladders made of metal, such as copper. When applied to an air cooled turn, the present invention directs air from the fan through finned heat exchangers. The of the inner turns secondary windings are bonded directly to the finned heat exchanger turn in order to provide good thermal contact and a large heat transfer area.

11 Claims, 3 Drawing Sheets

AIR/LIQUID COOLED METALLIC TURN FOR HIGH FREQUENCY HIGH POWER CHARGING TRANSFORMERS

BACKGROUND

The present invention relates to battery chargers, and more particularly, to an inductive charge port comprising air or liquid cooled metallic turns for use in secondary transformer windings of high power inductive battery charging apparatus.

The assignee of the present invention designs, develops and manufactures inductive charging systems for use in charging electric batteries of electric vehicles, and the like. The charging system employs a charge port comprising secondary windings and core that form a secondary of a transformer installed in the electric vehicle, and a charge coupler or probe comprising a primary winding and a core that form a primary of a transformer that is coupled to a power source and which is inserted into the charge port to charge the vehicle batteries. Charging of the batteries is done at high frequency and at high charging rates. Consequently, them is a great deal of heat buildup in the charge probe. The probe must be removed from the charge port by a user once charging is completed, and the temperature of the probe is a concern.

Four different approaches may be used to implement thermal management of inductive charge coupler port temperatures. The first approach is to rely on conduction of heat from the primary winding and core across an air gap interface to on-board heat exchangers having cooling air circulated by charge port fans. This approach works for systems operating from about 6 kw to 10 kw charging rates. The second approach is to route chilled air from off-board refrigeration unit through the coupler. This approach works for systems operating at charge rates from about 20 kw to 25 kw.

The third approach is to use a plastic heat exchanger that does not interact with the magnetic fields produced by the charging system. However, this approach has poor thermal transfer characteristics. The fourth approach is to use a metallic heat exchanger, that interacts with the magnetic field, resulting in a degree of proximity losses, depending on its location in the winding.

A discussion of metallic heat exchangers may be found in U.S. patent application Ser. No. 08/237,498, filed Apr. 29, 1994, entitled "Liquid Cooled Inductive Probe for High Power Charging", assigned to the assignee of the present invention, which describes how to cool a winding of an inductive probe with a liquid fed plastic bladder, and how to interface a liquid fed metallic heat exchanger in a winding of an inductive probe, such that there is no interacting with the magnetic fields. U.S. patent application "Ser. No. 08/237,493, filed Apr. 29, 1994", entitled "High Frequency Transformer Winding Having an Internally Liquid Cooled Winding", assigned to the assignee of the present invention, describes how to interface a liquid fed metallic heat exchanger in the winding of an inductive probe, and integrate this as a turn of the transformer winding such that there is no interaction of the heat exchanger with the magnetic fields. U.S. Pat. No. 5,408,209, issued Apr. 18, 1995, entitled "Cooled Secondary of Electric Automobile Charging Transformer"; assigned to the assignee of the present invention, describes how to cool a winding of a charge port with a heat pipe. U.S. patent application Ser. No. 08/146,690, filed Nov. 2, 1993, entitled "Ducted Air-Cooled Secondary of Automotive Battery Charging Transformer", assigned to the assignee of the present invention, describes how to cool a winding of a charge port with a ducted air-cooled heat exchanger. The disadvantage of this approach is that the air cooled heat exchanger is not an integrated turn, that is, it only serves as a heat exchanger.

Therefore, it is an objective of the present invention to provide for improved high power inductive battery charging apparatus employing air and liquid cooled metallic turns in secondary transformer windings in a charge port of the apparatus.

SUMMARY OF THE INVENTION

The present invention uses a heat exchanger that serves two purposes, namely that of a heat exchanger and also a turn of a transformer winding. The present invention comprises using the outer turns of an interleaved helical wound transformer as heat exchangers. The outer turns may have any shape or thickness, may be air or liquid cooled, or may be vapor changers (heat pipes). Other turns of the secondary windings cannot be used in this manner because they cause excessive energy dissipation, due to proximity losses.

When used to a liquid cooled turn, the present invention comprises porting liquid coolant from a cooling system including a pump, a compact heat exchanger, and a fan through the outer windings. Heat dissipation from the secondary windings of the transformer is efficiently removed by providing an internal coolant flow passage or passages formed or integrated at the center of the outer windings comprising the heat exchangers. The internal passages may be configured in several ways. One approach is to construct thin, flat, self-contained flexible coolant bladders made of metal, such as copper. The coolant may be comprised of a high dielectric material, such as a polyalphaolefin or flouronert. The high dielectric material exhibits a high resistance such that no current is induced in the coolant from magnetic fields or direct contact with the conductive fields. When applied to an air cooled turn, the present invention directs air from the fan through finned heat exchangers. The inner turns secondary windings are bonded directly to the finned heat exchanger turn in order to provide good thermal contact and a large heat transfer area.

The present invention provides for a transformer winding that serves the dual functions of a liquid or air heat exchanger and a magnetic winding of a transformer that operates above 10 kHz. The present invention is specifically useful in an inductive charge port of a battery charging apparatus for use with an electric vehicle, and is specific to the implementation of the secondary winding in the charge port. Use of the present invention permits rapid high rate charging of electric vehicles. However, the concepts of the present invention may be applied to any transformer.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

By way of introduction, the present invention provides for the design of a very high power density, high power, high frequency transformer. In the past, high power density transformers have been limited due to problems in cooling internal copper windings of the transformer. A metallic heat exchanger could not be inserted between windings, due to losses that are introduced (from the internal magnetic fields), and due to the wire construction used in conventional designs that did not have adequate surface area to properly remove the heat.

Cooling has been easily performed at low frequency (60 and 400 Hz) by making the winding a hollow tube winding and pumping a coolant (oil, water, etc) through it. However, this cannot be performed at high frequency (greater than 10 kHz) due excessive eddy current losses introduced by the excessive thickness of the tube that is required. Another method is to place an internal heat exchanger around the winding. Alternative methods of placing metallic heat exchangers internal (interleaved) between the primary and secondary windings were not thought to be possible due to losses in the heat exchanger caused by the internal magnetic fields. Because of these losses, the heat exchanger would have to be made of a non-metallic material having non-optimum heat transfer characteristics. The present invention partially overcomes this problem.

Figure 1:
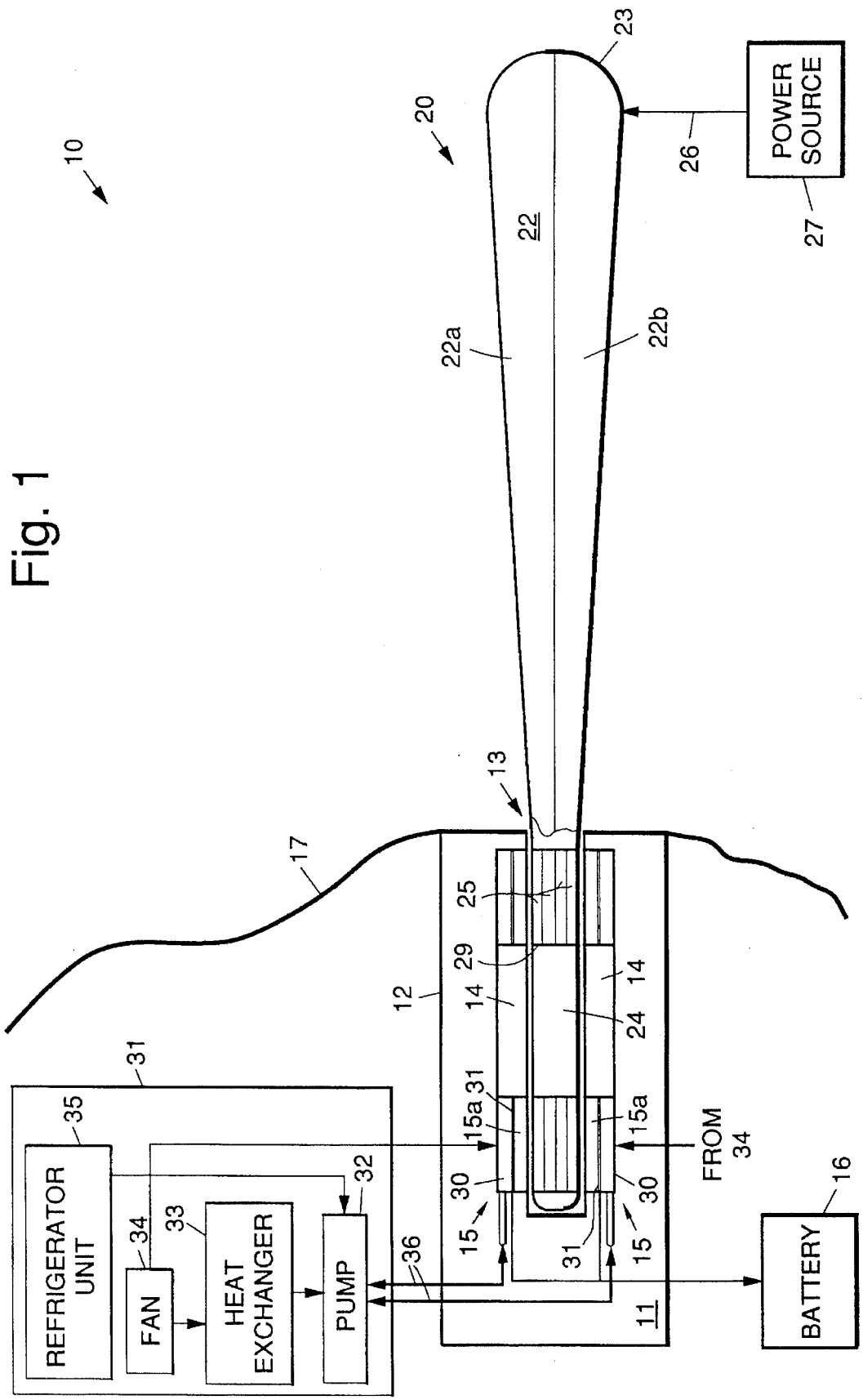
FIG. 1 is a partially cutaway side view of battery charging apparatus employing the charge port in accordance with the principles of the present invention.

Referring to the drawing figures, FIG. 1 is a partially cutaway side view of inductive battery charging apparatus 10 employing a charge probe 20 inserted into a charge port 11 in accordance with the principles of the present invention. The charge port 11 may be disposed in an electric vehicle 17, for example.

The inductive charging coupler 20 is comprised of a plastic coupler housing 22 that has two mating coupler halves 22a, 22b that are configured to provide a handle 23. The inductive charging coupler 20 is comprised of a center magnetic core 24 or "puck" 24, that may be comprised of ferrite, for example. A primary winding 25 is disposed around the center magnetic core 24. The mating coupler halves 22a, 22b of the inductive charging coupler 20 enclose the primary winding 25 and the center magnetic core 24. The primary winding 25 is comprised of four turns, for example, and is coupled by way of a power cable 26 to an external power source 27 for coupling energy to the charging coupler 20.

The housing 22 has a hollow disk-shaped section having substantially flat opposed surfaces and the tapered handle extends from the disk section. An opening 34 is disposed through each of the flat opposed surfaces of the hollow disk-shaped section. The center magnetic core 24 is disposed in the opening 34 and has opposed flat surfaces that are substantially coplanar with the substantially flat opposed surfaces of the housing 22.

The charge port 11 includes a housing 12 having an opening 13 into which the inductive charging coupler 20 is inserted. The charge port 11 comprises two secondary corn halves 14 and two sets of secondary windings 15 surrounding the core halves 14. The sets of secondary windings 15 are coupled to a battery 16 of the electric vehicle 17 in which it is housed. The charging coupler 20 is designed to be inserted into the opening 13 of the charge port 11 in order to couple current to the battery 15 from the external power source 27.

In accordance with one embodiment of the present invention, a coolant conducting heat exchanger 30 or bladder 30, is provided as an outer secondary winding or turn of each of the two sets of secondary windings 15. The coolant conducting heat exchanger 30 may be bonded to respective inner turns 15a of the sets of secondary winding 15 using conductive adhesive 31 or epoxy, for example. Details of the secondary windings 15 and coolant conducting heat exchangers 30 are discussed with reference to FIGS. 2–4 below.

The heat exchangers 30 are coupled to a cooling system 31 disposed on-board the vehicle 17 that comprises a coolant pump 32, a coolant heat exchanger 33, and a cooling fan 34. Combinations of these components may be used as cooling needs require, such a using the fan 34 to direct air on the finned heat exchanger 30. The present invention circulates liquid coolant from the on-board cooling system 31 in the vehicle 17 to the heat exchangers 30 by routing inlet and outlet coolant lines 36 thereto. The heat exchanger 30 may be water cooled, for example. The coolant may be comprised of a high dielectric material, such as a polyalphaolefin or flouronert, for example. The high dielectric material exhibits a high resistance such that no current is induced in the coolant from magnetic fields or direct contact with the conductive fields.

In another embodiment of the present invention, a finned heat exchanger 30 is employed. The respective secondary turns 15a are bonded directly to the finned heat exchanger 30 in order to provide good thermal contact and a large heat transfer area. The fan 34 is used to direct air over the respective finned heat exchangers 30.

In yet another embodiment of the present invention, a heat pipe is employed as the heat exchanger 30. The respective secondary turns 15a are bonded directly to the heat pipes in order to provide good thermal contact.

Figure 2:
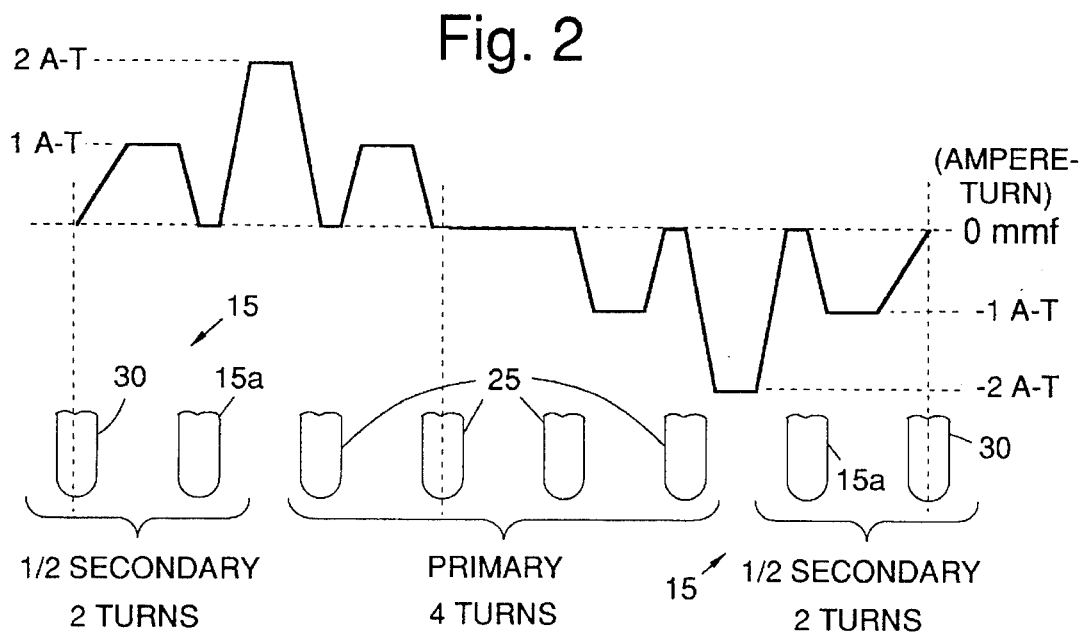
FIG. 2 shows an mmf diagram that illustrates current versus frequency rise relative to turns of the charge port.

The concepts of the present invention may be applied to the outer secondary turns of the sets of secondary winding 15. In the case of an inductive charge port 11, the primary winding 25 and core 24 are interleaved between the sets of secondary winding 15 and secondary core 14, and thus there are two outer turns, one regular conductive turn and the heat exchanger 30 as the outer turn. By looking at an mmf diagram, as is shown in FIG. 2, it can be determined that the outer windings only have a skin effect high frequency loss term. There is no proximity effect in the outer turns. The proximity loss term causes the winding thickness to be limited and a predetermined optimum thickness, for minimum loss. However, if the loss component is only from skin effect losses, the thickness of the turn (heat exchanger 30) can be infinite, with no extra power loss. There is an optimum where increasing the thickness does not decrease the power loss, but there is no penalty.

With the above general description of the construction of the coupler 20, the details regarding the specific improvements of the present invention are as follows. The principles of the present invention may be applied when the primary winding 25 is interleaved with the sets of secondary windings 15. A metallic material may be located as the outer turns of the sets of secondary winding 15, with minimal induced loss, if no magnetic field is present. By looking at the mmf diagram, such as as is shown in FIG. 2, it can be determined that in certain winding arrangements, certain turn-to-turn spacings have a near zero field. The metallic heat exchanger 30 may be inserted at the point of zero field, with minimal power loss. For example, in the case of a four turn primary winding 25, interleaved between a four turn secondary winding 15 (i.e. 2 turn secondary—4 turn primary—2 turn secondary), wherein the two turn sets of secondary windings 15 are connected in series, the mmf diagram clearly shows that there is almost no field at the outer turns of the four turn secondary winding 15, and thus the heat exchanger 30 may be placed at these locations. As can be seen, this works for an even number of secondary turns. The present invention is further enhanced by the use of flat helix or flat spiral turns for the sets of secondary windings 15. This provides the maximum surface area available for the transfer of heat. The turns of the sets of secondary winding 15 may be thermally bonded to the heat exchanger 30 using the thermally conductive adhesive 31.

This technique may be applied to any transformer design and specifically applicable to the design of an inductive coupled transformer charge port 11 for electric vehicles 17. The thermal limitations are severe for induction coupled transformers used in electric vehicles 17 (i.e. where the transformer primary winding 25 and core 24 are designed to be physically inserted between the sets of secondary windings 15 and core 14), since there is limited thermal contact therebetween.

In order to better understand the present invention the following theoretical discussion is presented. In transformer design, high frequency operation is desired to reduce the magnetic core size. This is based on the fundamental magnetic equation:

$$Ac = \frac{E}{4fNB \cdot 10^8}$$

where: Ac is the cross sectional area of the core, f is the frequency of operation, N is the number of primary turns, and B is the flux density, in gauss.

Thus it can be seen, that the magnetic core can be smaller, if higher frequency is used to excite the core. However, this is in conflict with the copper winding, which increase as a result of the eddy currents. Eddy current losses is a collective term for the redistribution of alternating current in conductors as a function of frequency (skin effect), and the phenomenon where one circuit carrying alternating current can induce circulating currents, without making ohmic contact, in any conductive material in the immediate vicinity of the circuit (proximity effect). Thus there is a fundamental limitation on how small the transformer core can be, based on the copper losses.

The skin effect loss is an increase in effective resistance due to high frequency current carried by the winding conductor alone. This occurs because as frequency rises, current density increases at the conductor surface and decreases toward zero at the center. The current tails off exponentially within the conductor. The portion of the conductor that is actually carrying current is reduced, so the resistance at high frequency (and resulting losses) can be many times greater than at low frequency. Skin depth, (sd) is defined as the distance from the surface to where the current density is 1/e times the surface current density (e is the natural log base).

$$sd = \sqrt{\rho/\pi * \mu * f}$$

where $\rho$ is the resistivity of copper and is given by $\rho = 0.69 \times 10^{-6}$ ohm-in at 20° C., and $\mu = 0.4\pi \times 10^{-8}$.

The simplest form of an equation for calculating high frequency winding losses for arbitrary current waveforms is given by:

$$Rac/Rdc(\text{skin effect}) = x*(e^{2x} - e^{-2x} + 2 \sin(2x))/(e^{2x} + e(-2x) - 2 \cos(2x)),$$

where x is layer thickness/skin depth.

Although the current density tails off exponentially from the surface, the high frequency resistance is the same as if the current density were constant from the surface to the penetration depth, then went abruptly to zero. What this means, is that regardless of the foil's thickness, the minimum resistance (AC resistance at a specified frequency) is limited to the DC resistance at the skin depth. Thus for one layer, or turn for a helical winding, the layer thickness may be as thick as desired, with no increased losses above the skin depth.

For multilayer coils the proximity effect is often the dominate effect. The apparent increase in the resistance of the conductors is caused by eddy currents in the conductors due to the magnetic fields impressed upon the conductors from other conductors in the windings. Note however that these eddy currents will exist even if the winding is open circuit. The losses exist with no net current flow, giving an infinite resistance. This is the situation with an electrostatic shield and a liquid cooled metallic heat exchanger inserted between the primary and secondary winding. The simplest form of the above equation is given by:

$$Rac/Rdc(\text{proximity effect}) = (2/3)*(m^2 - 1)*x*(e^x - e^{-x} + 2 \sin(x))/(e^x + e(-x) - 2 \cos(x)),$$

where x is the layer thickness/skin depth and m is the number of layers. This equation shows that the drastic increase in the losses due to proximity effects when more layers (turns) are used in a transformer winding, and why the layer thickness must be kept at value equal to the skin depth or less.

Figure 3:
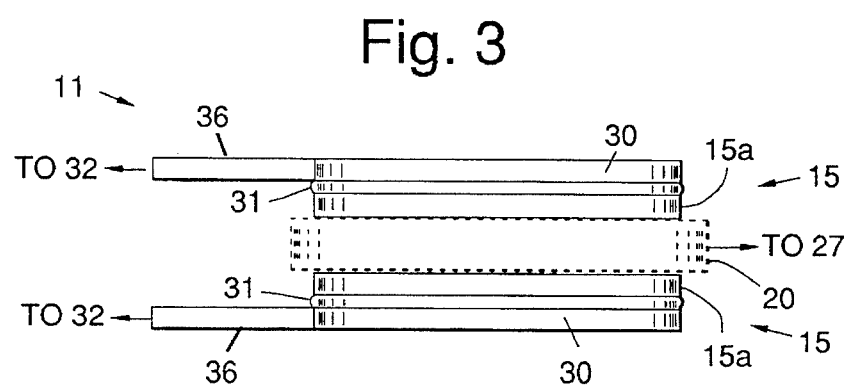
FIG. 3 is a side view of a portion of the charge port of FIG. 1.

For the purposes of completeness, FIG. 3 shows a side view of a portion of the charge port 11 of FIG. 1, specifically illustrating the bonding of the heat exchangers 30 to the inner turns 15a of the sets of secondary windings 15. As can be seen from FIG. 3, the heat exchanger 30 is conductively bonded to respective inner turns 15a of the sets of secondary windings 15 by means of the adhesive 31.

The internal coolant flow passages provided by the heat exchanger 30 may be configured in several ways. One approach is to construct thin, flat, flexible bladders 30 made of metal, such as copper. The inner turns 15a of the sets secondary windings 15 are bonded directly to the flat coolant heat exchanger 30 in order to provide good thermal contact, a large heat transfer area, and a very thin profile. The inlet and outlet coolant passages 36 transition from a very thin (0.050", nominal) rectangular cross sectional shape under the winding 25 to a round tube shape (0.25 inches in diameter).

The winding construction of the above described embodiment of the present invention implements a one turn per layer helical construction for the turn comprising the coolant carrying heat exchanger 30. However, the number of turns may be as many as desired, and the inner turns need not be a single helical turn. Spiral multiple turn layers may also be implemented. In any event, the outer turns of the interleaved helical transformer of the present invention have minimal proximity losses.

Figure 4:
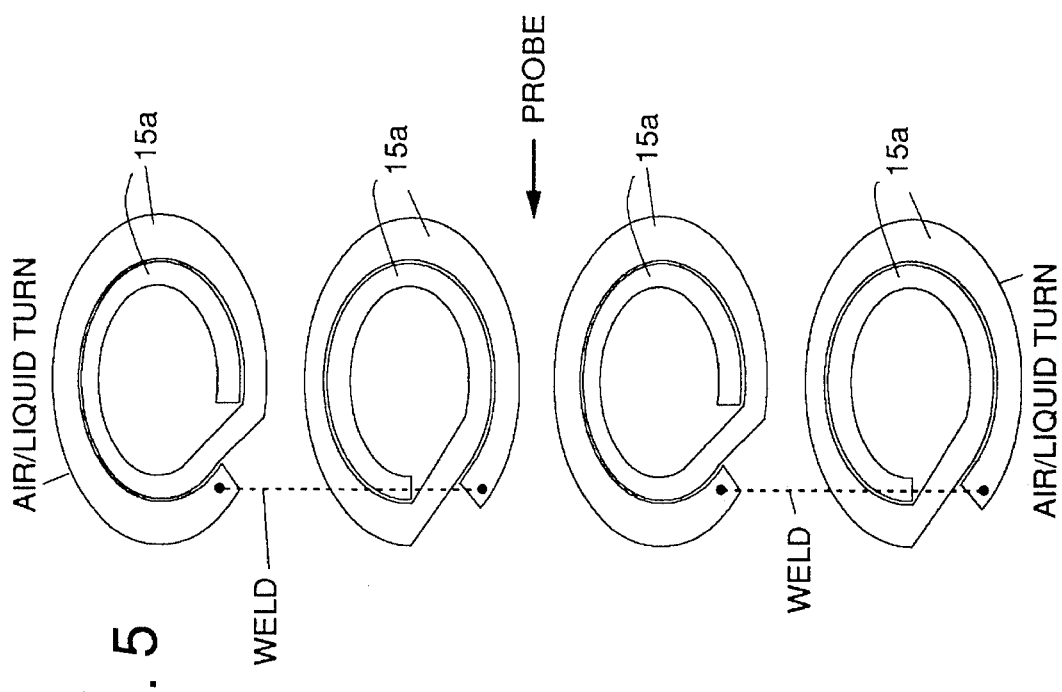
FIG. 4 shows an exploded view of a helical/partial spiral design of the windings used in the charge port of FIG. 1.
Figure 5:
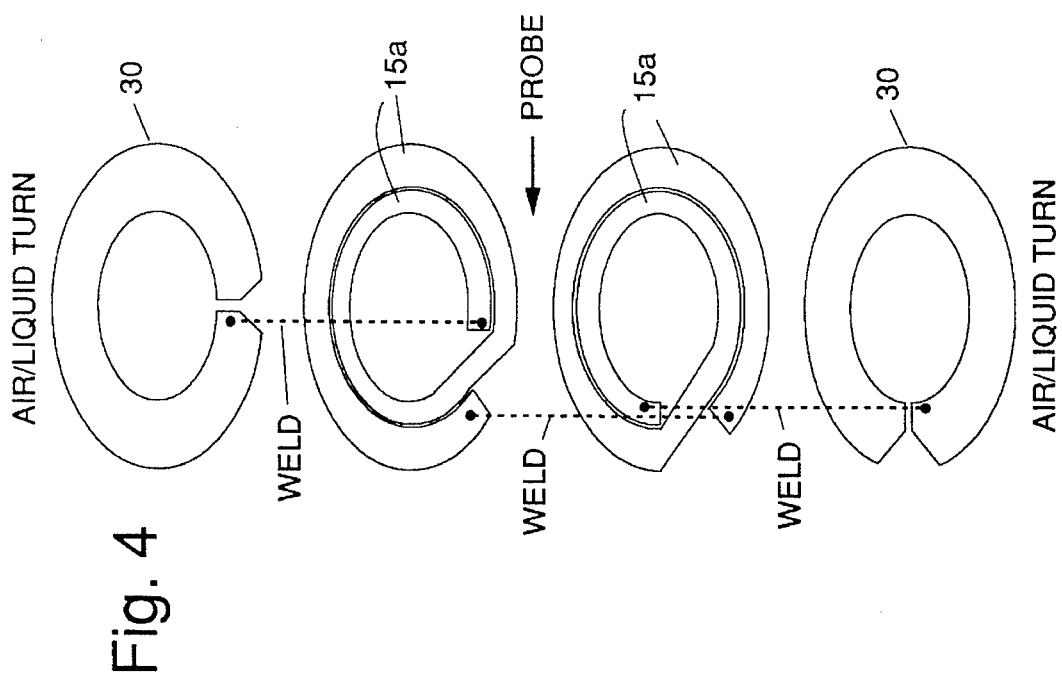
FIG. 5 shows an exploded view of a helical/spiral design of the windings used in the charge port of FIG. 1.

By way of example, FIG. 4 shows an exploded view of a helical/partial spiral design of the windings that may be used in the charge port of FIG. 1, and FIG. 5 shows an exploded view of a helical/spiral design of the windings that may be used in the charge port of FIG. 1. In FIG. 4, the windings comprise three turns each, while in FIG. 5, the windings comprise four turns each. The air or liquid cooled turn is the outermost turn of each design.

The present invention may be applied to any transformer design and is specifically applicable to the design of inductive coupled transformer charge ports 11 for electric vehicles 17. The present invention produces less loss and has a smaller size than previous transformer devices for use with charge ports 11 of electric vehicles 17.

Thus there has been described a new and improved inductive charge port comprising air and liquid cooled metallic turns in secondary transformer windings of high power inductive battery charging apparatus. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. In an inductive charging apparatus for use in charging a battery, which apparatus comprises a charging coupler that is insertable into a charge port that is coupled to the battery, and wherein the charging coupler comprising a housing, a primary magnetic core and a primary winding disposed in the housing, wherein said charge port comprises:

a housing;

an opening disposed in the housing into which the charging coupler is inserted;

spaced apart secondary cores disposed in the housing; and spaced apart secondary windings disposed around the respective secondary cores that each comprise an inner turn and an outer turn comprising a heat exchanger.

2. The charge port of claim 1 wherein the heat exchangers comprise coolant conducting heat exchangers.

3. The charge port of claim 2 wherein the coolant conducting heat exchangers couple a fluid therethrough.

4. The charge port of claim 3 wherein the fluid comprises water.

5. The charge port of claim 1 wherein the heat exchangers comprise air cooled heat exchanger.

6. The charge port of claim 1 wherein the heat exchangers comprise heat pipes.

7. The charge port of claim 1 wherein the heat exchangers are thermally bonded to the primary turns of the secondary windings by means of heat conducting adhesive.

8. The charge port of claim 2 wherein the heat exchanger is thermally bonded to the primary turns of the secondary windings by means of heat conducting adhesive.

9. The charge port of claim 5 wherein the heat exchanger is thermally bonded to the primary turns of the primary winding by means of heat conducting adhesive.

10. The charge port of claim 1 further comprising a pump for circulating the fluid through the coolant conducting heat exchanger.

11. The charge port of claim 1 further comprising a fan for cooling the air cooled heat exchanger.

* * * * *